United States Patent Office 3,168,079
Patented Feb. 2, 1965

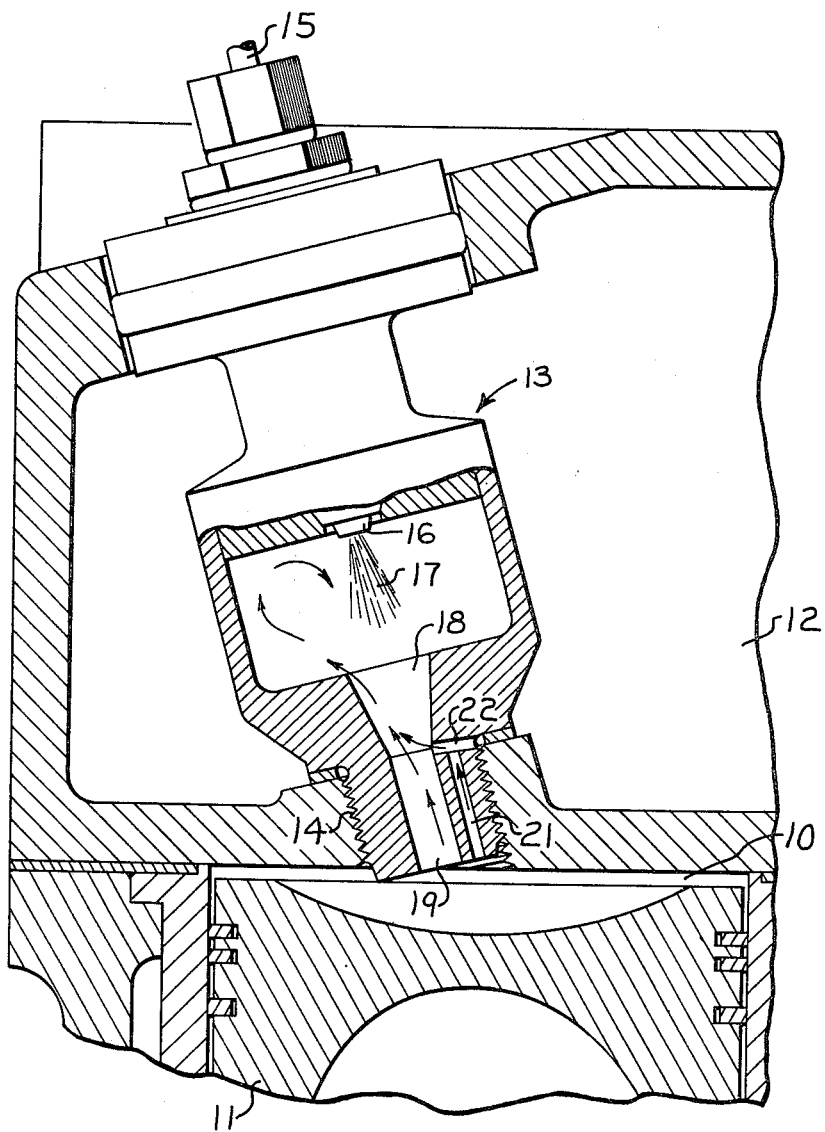

3,168,079
PRECOMBUSTION CHAMBER WITH MEANS TO IMPROVE AIR FLOW PATTERN
Rex D. Henderson, Peoria, Ill., assignor to Caterpillar Tractor Co., Peoria, Ill., a corporation of California
Filed Mar. 5, 1963, Ser. No. 262,945
2 Claims. (Cl. 123—32)

This invention relates to precombustion chambers for internal combustion engines of the compression ignition type and particularly to means for correcting deficiencies common to most such engines which result from undesirable air flow patterns in their precombustion chambers.

It has been determined that a great deal of excessive exhaust smoking which occurs at certain loads and speeds in internal combustion engines of the divided chamber type results from unatomized and unburned fuel in the precombustion chamber entering the main combustion chamber where it does not attain complete combustion. Another undesirable phenomenon commonly encountered in such engines is irregularity of cylinder pressures in successive firing cycles. Both of the above mentioned problems are found to result from faulty and irregular air flow patterns in the precombustion chamber.

It is, therefore, an object of the present invention to provide a precombustion chamber with means to alleviate the above mentioned problems.

A further object is to provide a precombustion chamber with means to induce an outwardly directed or vortex type of flow to air entering the precombustion chamber under pressure from the main combustion chamber in order to prevent fuel from collecting on the precombustion chamber walls.

Further and more specific objects and advantages of the invention and the manner in which it is carried into practice are set forth in the following specification by reference to the accompanying drawing.

The drawing is a fragmentary view in section of a portion of an engine showing a combustion chamber thereof and a precombustion chamber embodying the present invention.

The main combustion chamber of an engine is illustrated at 10 between the head end of a piston 11 and the lower deck of a cylinder head 12. A precombustion chamber, generally indicated at 13, extends through cylinder head 12 and is threadedly connected at 14 for communication with the main combustion chamber. Fuel from a conventional fuel pump enters the precombustion chamber through a conduit 15 and a nozzle 16 to produce a spray pattern somewhat as indicated at 17 where ignition originates to create burning which progresses outwardly through a throat 18 and orifice 19 for completion in the main chamber 10. This creates the pressure which urges the piston downwardly through the power stroke of its cycle.

During the upward or compression stroke of the piston 11, air having entered the main chamber through the conventional intake valve, not shown, is compressed and forced upwardly into the precombustion chamber centrally through the orifice and throat thereof and has been found to impinge the spray pattern 17 spreading the fuel radially outwardly therefrom into contact with the walls of the precombustion chamber. This unburned fuel finds its way into the main combustion chamber where it causes excessive exhaust smoking. Furthermore, this results in erratic engine operation since different quantities of fuel attain combustion in successive cycles and variations in cylinder pressures result. It is desirable, therefore, to intercept air under pressure entering the precombustion chamber through the orifice and throat thereof to vary its path of flow and prevent direct impingement thereof with the spray pattern 17. Any solid object placed in the path of air entering the precombustion chamber would occupy a position where it is subject to destruction by intense heat and would also interfere with proper flow of burning fuel oirginating in the area of the spray pattern and passing outwardly through the throat orifice.

According to the present invention, the air flow pattern into the precombustion chamber is varied by providing a passage 21 communicating between the main combustion chamber 10 and a passage 22 which communicates with the entry to the precombustion chamber in the area where the orifice and throat merge. With this arrangement, some of the air under pressure created by the compression stroke of the piston passes through the passages 21 and 22 and forceably enters the throat 18 adjacent its smaller or lower end. This small stream of air under pressure intercepts and biases the direction of the main stream entering through the orifice and throat imparting a swirling or vortex type flow thereto so that it flows in greater part outwardly toward the walls of the precombustion chamber as indicated by arrows in the drawing instead of impinging the outer end of the spray pattern 17. This prevents the undesirable radially outwardly dispersion of the fuel in the spray pattern which causes fuel to be deposited on the chamber walls and subsequent smoking and erratic combustion.

I claim:
1. In a precombustion chamber for use in an internal combustion engine which includes an injection nozzle directed inwardly of the chamber from one side thereof, a tapered throat at the other side coaxially aligned with the nozzle and a tubular orifice communicating between the tapered throat and the main combustion chamber of the engine and coaxial with the throat, the improvement which comprises a passage communicating between the main combustion chamber and the juncture of the tapered throat and tubular orifice.
2. The combination of claim 1 in which said passage is disposed at an agle to the axis of the throat and inclined toward the precombustion chamber.

References Cited in the file of this patent
UNITED STATES PATENTS
1,648,647    Krettingen _____ Nov. 8, 1927
FOREIGN PATENTS
382,480    Germany _____ Oct. 3, 1923
458,236    Germany _____ Apr. 2, 1928
52,710    Sweden _____ May 30, 1919